(12) United States Patent
Leung et al.

(10) Patent No.: US 6,922,811 B1
(45) Date of Patent: Jul. 26, 2005

(54) CHINESE CHARACTER ENCODING INPUT METHOD AND ITS INPUT APPARATUS

(75) Inventors: Lap Yan Leung, Kowloon (HK); Man Kin Lau, Kowloon (HK)

(73) Assignee: QCode Information Technology Limited, Kowloon (HK)

( * ) Notice: Subject to any disclaimer, the term of this patent is extended or adjusted under 35 U.S.C. 154(b) by 0 days.

(21) Appl. No.: 09/431,049

(22) Filed: Nov. 1, 1999

(30) Foreign Application Priority Data

Jul. 28, 1999 (HK) .......................................... 99103246

(51) Int. Cl.⁷ .............................................. G06F 17/21
(52) U.S. Cl. ...................... 715/535; 715/703; 715/780
(58) Field of Search ................................ 715/535, 703, 715/780; 345/467, 703, 780

(56) References Cited

U.S. PATENT DOCUMENTS

| | | | |
|---|---|---|---|
| 4,379,288 A | * | 4/1983 | Leung et al. .................. 341/28 |
| 4,505,602 A | * | 3/1985 | Wong .......................... 400/110 |
| 4,679,951 A | * | 7/1987 | King et al. ................... 400/110 |
| 5,109,352 A | * | 4/1992 | O'Dell ........................ 715/542 |

FOREIGN PATENT DOCUMENTS

| | | |
|---|---|---|
| CN | 85100919 A | 7/1986 |
| CN | 85105023 A | 1/1987 |
| CN | 91109420.2 | 5/1993 |

* cited by examiner

Primary Examiner—Heather R. Herndon
Assistant Examiner—Adam Queler
(74) Attorney, Agent, or Firm—Birch, Stewart, Kolasch & Birch, LLP (57) ABSTRACT

Disclosed are a method which is used in a computer or a communicative mobile telephone to achieve the JiuGong input of Chinese characters and a Chinese language computer or mobile telephone thereof, in which Chinese characters are divided into two classes, that is, monolithic character and transverse character, the character fonts of starting strokes are divided into nine classes, each of which respectively corresponds to the number keys 1–9 to input, 81 radicals in nine groups are used, the JiuGong pattern introduction method is adopted, and the number keys 1–9 are used to input, so that two or three keys are enough to carry out the input of a character to be inputted. The method of this invention is easy to study and could be grasped within two minutes or three without learning by rote, even an inputter who is a tyro could in short time make the input speed up to above 30 words per minute.

10 Claims, 9 Drawing Sheets

| | first column ↓ | second column ↓ | third column ↓ |
|---|---|---|---|
| first row → | 7 *<br>dot | 8 —<br>straight | 9 /<br>oblique |
| second row → | 4 O<br>circle | 5 U<br>cave | 6 A<br>steeple |
| third row → | 1 +<br>cross | 2 X<br>fork | 3 Z<br>zigzag |

Fig. 1

|  | first column ↓ | second column ↓ | third column ↓ |
|---|---|---|---|
| first row → | 7 *<br>dot | 8 —<br>straight | 9 /<br>oblique |
| second row → | 4 O<br>circle | 5 U<br>cave | 6 A<br>steeple |
| third row → | 1 +<br>cross | 2 X<br>fork | 3 Z<br>zigzag |

Fig. 2

|  |  |  |  |
|---|---|---|---|
| first row | 7 | 8 | 9 |
| second row | 4 | 5 | 6 |
| third row | 1 | 2 | 3 |
| fourth row | 0 | | Del |

| | | |
|---|---|---|
| 7、 | 8氵 | 9冫 |
| 4亠 | 5宀 | 6疒 |
| 辶 | 火 | 心 |

| | | |
|---|---|---|
| 一 | 丨 | 卜 |
| 厂 | 雨 | 覀 |
| 中 | 巾 | 虫 |

| | | |
|---|---|---|
| 丿 | 亻 | 厂 |
| 宀 | 千 | 𠆢 |
| 刀 | 勹 | 白 |

| 口 | 尸 | 日 |
|---|---|---|
| 目 | 田 | 巳 |
| 贝 | 足 | 骨 |

| 一 | 冈 | 冂 |
|---|---|---|
| 几 | 门 | 凵 |
| 匚 | ㇕ | 山 |

| 人 | 八 | 𠆢 |
|---|---|---|
| 氺 | 金 | 食 |
| 父 | 小 | 仓 |

| 十 | 扌 | 土 |
|---|---|---|
| 圭 | 木 | 束 |
| 艹 | 廿 | 车 |

| 广 | ㄨ | 犭 |
|---|---|---|
| 力 | 女 | 大 |
| 夯 | 戈 | 七 |

| 𠃌 | 厶 | 马 |
|---|---|---|
| 阝 | 刁 | 力 |
| ㄴ | 弓 | 幺 |

| 丶 | 氵 | 阝 |
|---|---|---|
| 亠 | 宀 | 广 |
| 辶 | 火 | 心 |

Fig. 17B

| 主 | 意 | 弃 |
|---|---|---|
| 文 | 高 | 商 |
| 六 | 立 | 文 |

Fig. 17C

| 主 | 意 | 弃 |
|---|---|---|
| 文 | 高 | 商 |
| 六 | 立 | 文 | highlight

CHINESE CHARACTER ENCODING INPUT METHOD AND ITS INPUT APPARATUS

FIELD OF THE INVENTION

The present invention relates to computer application field, more particularly to a Chinese character encoding input method by which Chinese characters are written via a computer and an input apparatus thereof.

BACKGROUND OF THE INVENTION

There have been many technical solutions to typewriting Chinese characters via a computer. For example, on the premise that a Chinese character library is added into the hardware, or a Chinese character library is installed into the memory of a computer via CD, Chinese character computer input can be realized according to a certain predetermined Chinese character computer input method. At present, there have been several hundred Chinese character computer input methods, each of which has its own characteristic and peculiarity, but a common shortcoming exists, that is, input speed is slow, and on average four to five or more keys are needed to input a Chinese character. Moreover, it is necessary to remember many Chinese character radicals and a decomposing method of Chinese characters, therefore it is difficult to study and remember. There are increasing requirements of Chinese character computer input methods in computer technology, communication technology, information transmission, network transmission technology and the like, so it is necessary to find an input method and its corresponding apparatus that is simple and convenient, needs less content to learn by rote and less key touch.

SUMMARY OF THE INVENTION

It is an object of this invention to provide a method for realizing Chinese character input in an information transmission apparatus such as a computer, telephone, or mobile telephone, an input apparatus thereof and a computer and telephone including such apparatus. As compared with the prior art, the Chinese character input method of present invention needs less key touch, needs less information to learn by rote and is easy to remember and use.

To achieve the above object, according to the Chinese character encoding input method of the invention, all Chinese characters are divided into two groups, monolithic characters and transverse characters, all shapes of starting strokes of Chinese characters are divided into nine groups, that is, dot shape, straight shape, oblique shape, circle shape, cave shape, steeple shape, cross shape, fork shape and zigzag shape, each shape corresponds to one of the numbers 1–9, and a JiuGong lattice is constituted by three rows and three columns, 3×3, nine squares. Each shape of the starting strokes further corresponds to a set of 9 radicals, thus altogether 81 radicals are arranged in JiuGong form respectively. Under the direction of a JiuGong lattice, firstly, a corresponding number key is pressed according to the starting stroke of a Chinese character to be inputted; secondly, according to a radical to be inputted, a corresponding radical in a JiuGong lattice pattern is selected, a number key of the keyboard determined by the position of said radical in the JiuGong lattice is pressed; thirdly, if the Chinese character to be inputted is a monolithic character, a function key is pressed, then the selection of the Chinese character starts; if the Chinese character to be inputted is a transverse character, a corresponding number key is pressed according to the shape of the starting stroke of the right-half of said Chinese character, then the selection of the Chinese character starts. Thus the input of a Chinese character is completed. The input apparatus of the invention includes a keyboard containing at least number keys 1–9 and two function keys, and the keys 1–9 of said keyboard correspond to nine shapes of the starting strokes of Chinese characters, and the number keys 1–9 are arranged into three rows and three columns in the JiuGong lattice pattern. The Chinese character computer further contains a Chinese character library, a JiuGong lattice pattern library and an exclusive control program.

The feature and advantage of this invention will be further described with reference to the attached drawings.

DETAILED DESCRIPTION OF THE PREFERRED EMBODIMENT

The invention will be described in detail with reference to the attached drawings.

Figure 1:
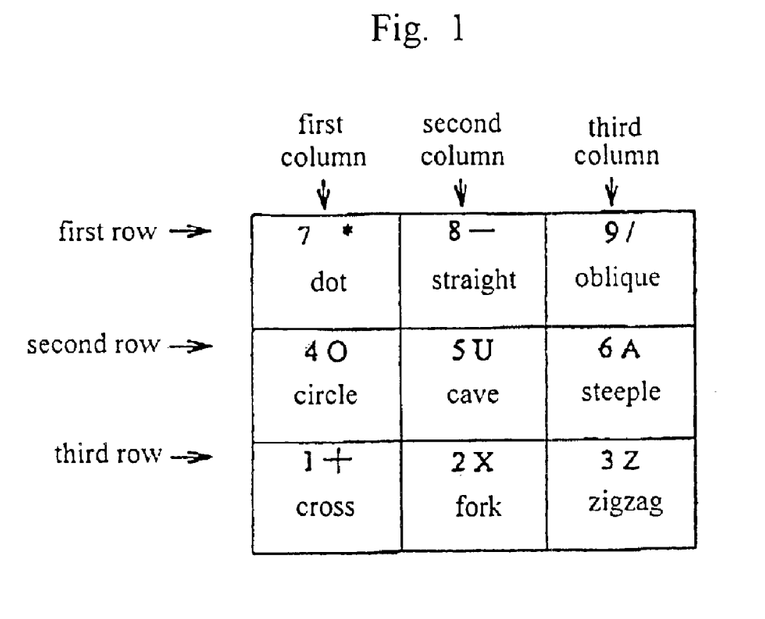
FIG. 1 is an explanatory drawing of the relationship between character shape and its corresponding number according to the Chinese character JiuGong input method of the invention.

Referring to FIG. 1, FIG. 1 is an explanatory drawing of the relationships between character shapes and their corresponding numbers according to the Chinese character JiuGong input method of the invention. The characteristic of the encoding of the invention is that, all Chinese characters are divided into nine shape groups, that is, dot shape, straight shape, oblique shape, circle shape, cave shape, steeple shape, cross shape, fork shape and zigzag shape, each character shape corresponds to one of the numbers 1–9, so that Chinese character input operation can be realized through the number keys in the keyboard of a computer, or through a separate keyboard of number keys. It is also a characteristic of the invention that only number keys 1–9 are needed to realize Chinese character computer input.

The relationships between character shapes and their corresponding number according to the invention are as follows. As shown in FIG. 1, Nine numbers are distributed into 3 rows and 3 columns. There are three squares every row, each of which corresponds to a number. Also there are three squares every column, each of which corresponds a number. Thus a nine-square lattice, containing nine squares, is constituted. According to Chinese culture, it is called a JiuGong lattice, which is used throughout the Chinese character input. In the JiuGong lattice, numbers corresponding to dot shape, straight shape and oblique shape respectively are 7, 8, 9 at first row from left to right; numbers corresponding to circle shape, cave shape and steeple shape respectively are 4, 5, 6 at second row from left to right; numbers corresponding to cross shape, fork shape and zigzag shape respectively are 1, 2, 3 at third row from left to right. The character shapes of Chinese characters are divided in groups, so that at step1 and step3 of the Chinese character JiuGong input method of the invention they can be used. The specific form that every shape covers is as follows:

A dot shape is denoted by "*", that is, the key 7, and it covers those Chinese characters which start with a dot stroke, for example, 永, 实, 病, 次, 汕, 火, 心, also, it covers the following nine radicals, i.e., 丶, 氵, 冫, 亠, 宀, 广, 辶, 火, 心. A straight shape is denoted by "-", that is, the key 8, and it covers those Chinese characters which start with a horizontal or vertical stroke, for example, 王, 两, 面, 中, 愿, 虎, also, it covers the following nine radicals, i.e., 丨, 卜, 厂, 雨, 西, 中, 巾, 虫. An oblique shape is denoted by "/", that is, the key 9, and it covers those Chinese characters which start with an oblique stroke, for example, 我, 毛, 香, 受, 反, 急, 年, 笋, 作, also, it covers the following nine radicals, i.e., 丿, 亻, 厂, 𠂉, 千, 𠂎, 𠂊, 勹, 白. A circle shape is denoted by "o", that is, the key 4, and it covers those Chinese characters which include a four-side frame, for example, 国, 圆, 目, 尸, 巴, 民, also, it covers the following nine radicals, i.e., 口, 尸, 日, 目, 田, 已, 贝, 足, 骨. A cave shape is denoted by "U", that is, the key 5, and it covers those Chinese characters which have an incomplete frame with three sides, for example, 同, 山, 月, 风, 冥, 巨, 帚, 凶, also, it covers the following nine radicals, i.e., 冂, 冈, 门, 几, 门, 凵, 匚, 彐, 山. A steeple shape is denoted by "A", that is, the key 6, and it covers those Chinese characters which is of steeple form, for example, 金, 分, 父, 谷, 小, 祭, 食, also, it covers the following nine radicals, i.e., 人, 八, 入, 𠆢, 𠂇, 𠂉, 父, 小, 仑. A cross shape is denoted by "+", that is, the key 1, and it covers those Chinese characters which include a cross-alike form, form example, 直, 提, 土, 青, 木, 草, 革, also, it covers the following nine radicals, i.e., 十, 扌, 土, 王, 木, 束, 艹, 廿, 车. A fork shape is denoted by "X", that is, the key 2, and it covers those Chinese characters in which two strokes intersect to form "X", and one of the two strokes is oblique, for example, 有, 杀, 大, 春, 成, 力, 女, 也, 七, also, it covers the following nine radicals, i.e., 㐅, 乂, 犭, 力, 女, 大, 𦍌, 戈, 七. A zigzag shape is denoted by "Z", that is, the key 3, and it covers those Chinese characters which have a zigzag stroke, for example, 了, 飞, 参, 阵, 刀, 丝, 弓, 马, also, it covers the following nine radicals, i.e., 乛, 厶, 马, 阝, 乛, 刀, 乚, 弓, 幺. The program steps of the Chinese character JiuGong input method will be described with reference to FIG. 3.

Figure 2:
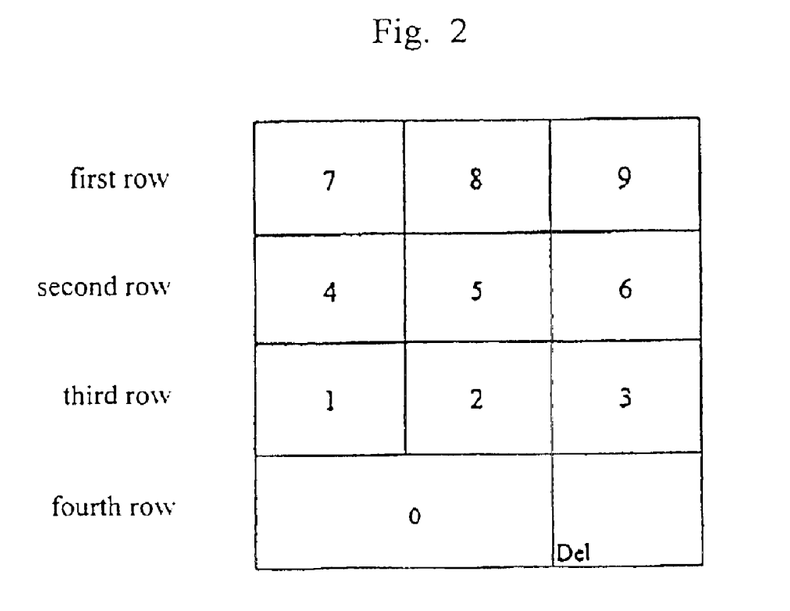
FIG. 2 is a schematic graph showing a minimum keyboard for the Chinese character JiuGong input method of the invention.

Referring to FIG. 2, FIG. 2 is an explanatory drawing of an embodiment of a minimum keyboard used in the Chinese character JiuGong input method of the invention. The keyboard in the FIG. 2 has 11 keys, which are distributed into 4 rows and 3 columns. The bigger key in the 4$^{th}$ row, occupying a place of two keys, is denoted by "0". It can also be denoted by other symbols, but it is most convenient to use "0" to denote it, because there are keys "0" in computer keyboards, telephone and mobile telephone keyboards. In the invention, the key "0" is a function key, one of the two function keys in the 4$^{th}$ rows, so that the Chinese character input can be performed through a keyboard having only 11 keys.

Figure 3:
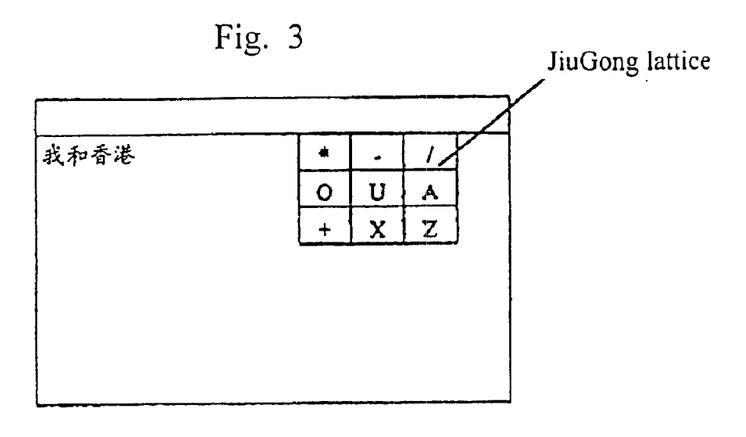
FIG. 3 is a graph showing a JiuGong lattice on a display screen according to the Chinese character JiuGong input method of the invention.
Figure 6:
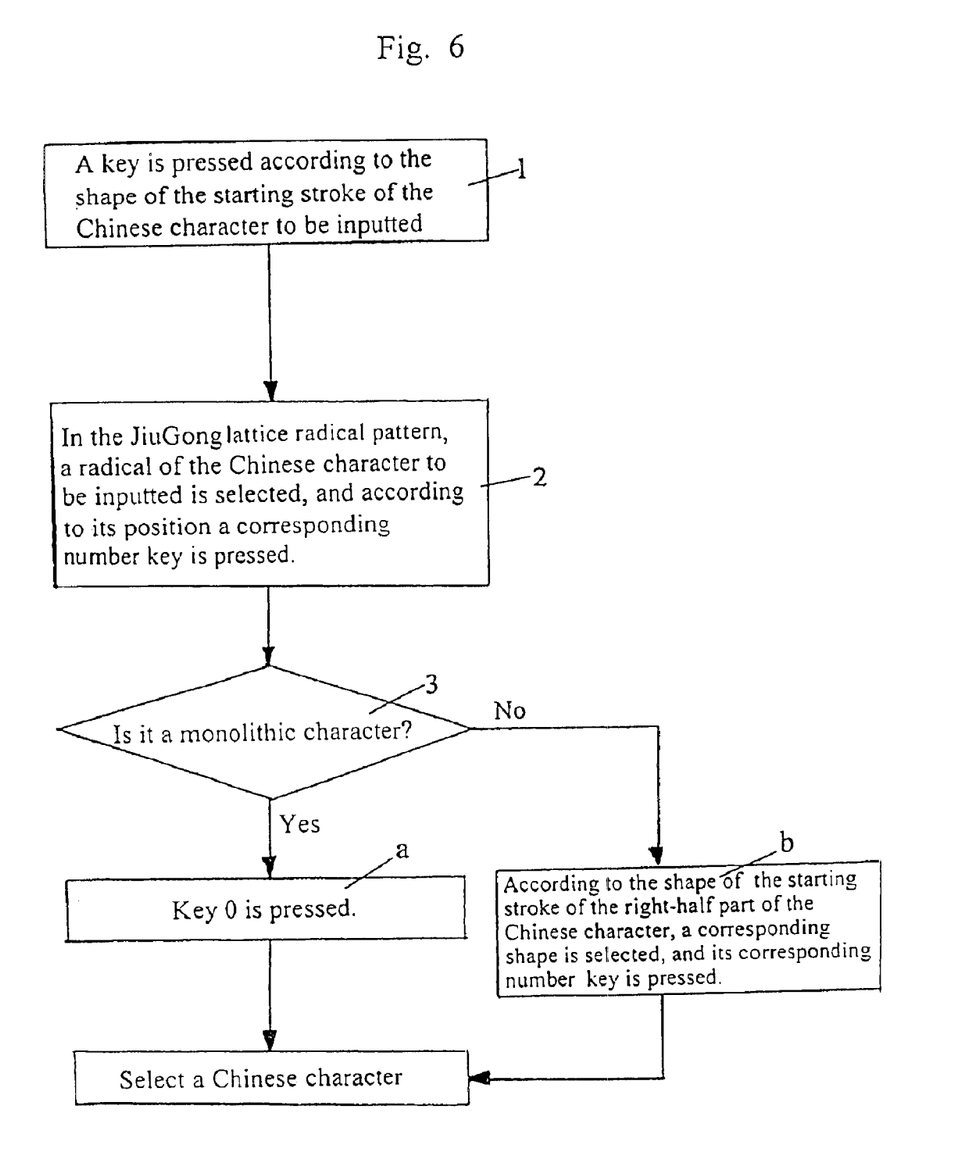
FIG. 6 is a flow chart of the Chinese character JiuGong encoding input method of the invention.

Referring to FIG. 3, FIG. 3 is a graph showing a JiuGong lattice on a display screen according to the Chinese character input method of the invention. To the end, firstly, the steps of the Chinese character computer input method of the invention will be described. There are mainly three steps. When a computer is powered and a Chinese character input program is run, a JiuGong lattice appears, for example, at upper right corner on the computer display screen. In the lattice are the denotations of the respective shape. At step1, according to the shape of the starting stroke of the Chinese character to be inputted (as to the content of the shape of a starting stroke, it has been fully explained in the description of FIG. 1), a key is pressed, then the content in the JiuGong lattice on the display screen changes to a JiuGong lattice radical pattern, including nine radicals. Then, at step 2, it is determined which radical of the JiuGong lattice radical pattern is the radical of the Chinese character to be inputted, then a corresponding number key is pressed based on the position of the determined radical. After the corresponding number key is pressed, the JiuGong lattice radical pattern changes to a picture of nine Chinese characters, a step 3 starts here. In case of a Chinese character which can not be split, such as 高, 首, 图 and the like, step 3 is a stage of highlighting and selecting, and after key 0 is pressed, a selecting step starts. If the character to be inputted has been among the nine Chinese characters of the JiuGong lattice, a corresponding key is pressed, the input Chinese character jump into the position to which the cursor points in the typing picture. If the character to be inputted has not been among the nine Chinese characters of the JiuGong lattice, a predetermined function key is pressed to change the JiuGong lattice Chinese character picture, and a next picture of nine Chinese characters appears in the JiuGong lattice. The operation is repeated until the Chinese character to be inputted has been among the nine Chinese characters of the JiuGong lattice. Then it is input to jump into the position to which the cursor points in the typing picture. In case of a Chinese character which can be split into a left-half and right-half, such as 相, 柳, 部, and so on, according to the definition the respective shape of FIG. 1, and considering the starting stroke or the characteristic of main part of the character to be inputted except the radical, a corresponding number key is decided. The Chinese character picture of JiuGong lattice on the display screen changes to a picture of nine Chinese characters determined through combining step 1, step 2 and step 3. After this, the stage of highlighting and selecting described above starts, a Chinese character is selected, referring to FIG. 6.

According to the method, only two keys or three are needed to input a Chinese character. Due to the very fast input speed of the method, it is also called JiuGong fast code method.

Another characteristic of the method is that the content to be continued is displayed through a JiuGong pattern, needless to learn by rote, so that all operations are suggested in a picture of JiuGong lattice on the display screen, and user can perform a further operation on basis of the suggestion.

Only three steps are needed in the method to realize the input of Chinese characters, so it is one of the input methods containing minimum steps.

The invention makes use of a Chinese characteristic JiuGong lattice to reduce complexity of Chinese character input, and nine character shapes, leading to 9×9, i.e., 81 radicals, are used, so that thousands of Chinese characters, which are commonly used, are covered by the 81 radicals.

All characteristics described above belong to the characteristics of the invention.

Figure 4:
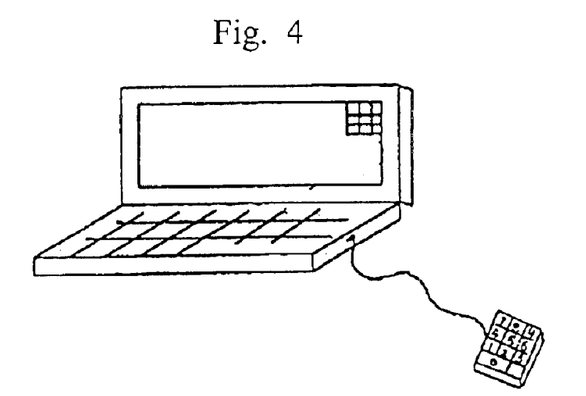
FIG. 4 is an explanatory drawing of an embodiment of an apparatus used for the Chinese character JiuGong input method of the invention.

Referring to FIG. 4, FIG. 4 is a explanatory drawing of an embodiment of an apparatus according to the Chinese character JiuGong input method of the invention. A computer of book size, a laptop computer is shown in the figure. Connected to the keyboard of the embodiment of the invention shown in FIG. 2 through an interface, it can work anywhere, and is portable. The attached keyboard shouldn't be too large, or too small to fit adult's fingers, and can be, for example, the same size as the corresponding part of a standard computer keyboard. The configuration is suitable for anybody who input Chinese characters at any place using the method of the invention, and it will bring people great convenience.

In the configuration of FIG. 4, the computer can be replaced by other types of computers, for example, a desktop computer, a large notebook computer and so on. And it is also available.

Figure 5:
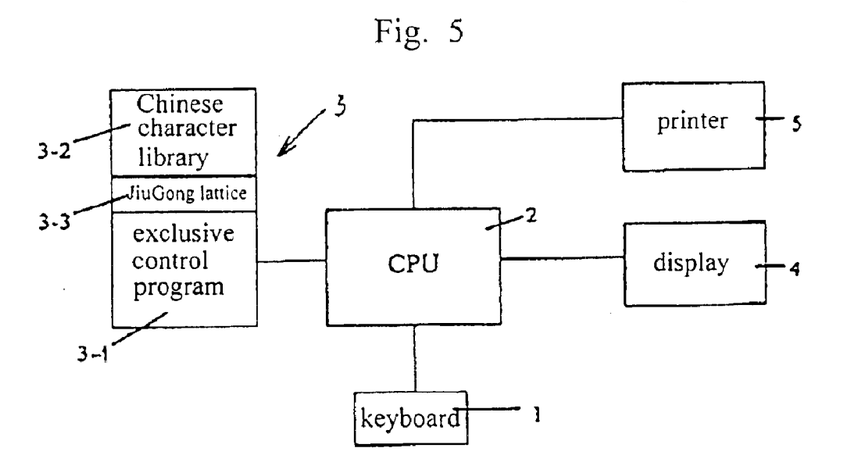
FIG. 5 is a basic block diagram of a computer device according to the Chinese character JiuGong encoding input method of the invention.

Referring to FIG. 5, FIG. 5 is a basic block diagram of a computer apparatus according to the Chinese character JiuGong encoding input method of the invention. The computer apparatus includes a keyboard 1, a CPU 2, a memory 3, a display 4 and a printer 5, in which CPU 2 is connected with each of other components to perform the command and program control. The computer apparatus is characterized in that an exclusive control program 3-1, a Chinese character library 3-2 and a JiuGong lattice pattern library 3-3 are contained in memory 3. Chinese characters, which are inputted in advance, are stored in the Chinese character library 3-2. JiuGong lattice patterns are stored in the JiuGong lattice pattern library 3-3, which includes symbols and Chinese characters which are inputted and arranged in advance, so that under the control of the instruction from the keyboard 1 and the CPU 2, it can be outputted at a predetermined position on the display frame after frame through the exclusive control program 3-1 to perform the operation of Chinese character input. For example, the JiuGong character and Chinese character shown in FIG. 1 are displayed.

The Chinese character library 3-2 and JiuGong lattice pattern library 3-3 and their corresponding exclusive control program 3-1, related to Chinese character JiuGong fast code input method, could also be stored in the form of a software or compact disc, then loaded into a computer to use.

Because the Chinese character JiuGong fast code library 3-2, pattern library 3-3 and exclusive control program 3-1, containing Chinese character decomposing expression, how to match, select a symbol and highlight, are preset or inputted in the computer, the Chinese character input operation, using Chinese character JiuGong encoding method, are ensured to be a fast and simple Chinese character input method.

Figure 7:
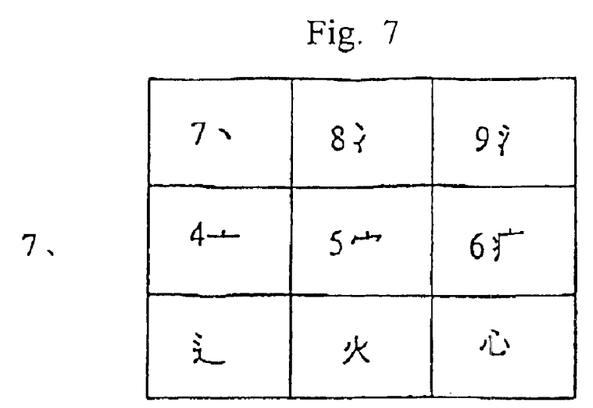
FIG. 7 is a schematic drawing of a JiuGong lattice radical pattern, which appears when key 7 is pressed at step 1 according to Chinese character JiuGong input method.

Referring to FIG. 7, FIG. 7 is a JiuGong lattice pattern, which appears when key 7 is pressed at step 1 according to Chinese character JiuGong input method. The pattern includes nine radicals which are related to the dot shape, and whose starting stroke is a dot shape. In this pattern, based on the position of the corresponding radicals, a number key is selected, for example, if the character to be inputted is the character 火, or has the radical "火", then key 2 is pressed; if the character to be inputted has the radical "宀", then key 6 is pressed, and so on. In the invention, only these nine radicals are selected in the dot shape group.

Figure 8:
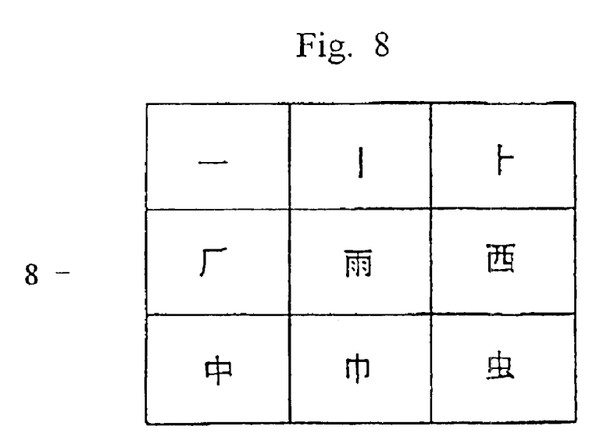
FIG. 8 is a schematic drawing of a JiuGong lattice radical pattern, which appears when key 8 is pressed at step 1.

Referring to FIG. 8, similar to FIG. 7, FIG. 8 is a JiuGong pattern, which appears when key 8 is pressed at step 1, it includes nine radicals whose first strokes are related to the straight shape. If the radical "-" is selected, then key 7 is pressed; If the radical "中" is selected, then key 1 is pressed, and so on.

Figure 9:
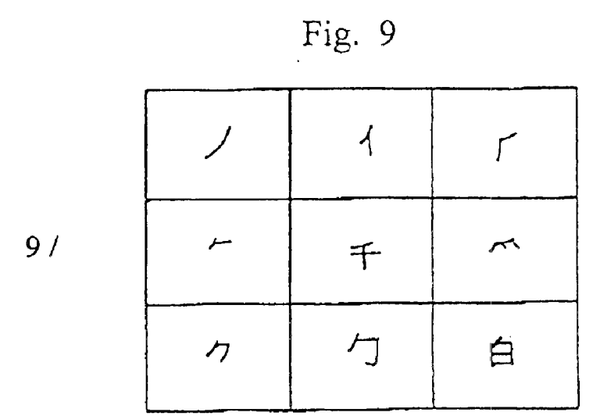
FIG. 9 is a schematic drawing of a JiuGong lattice radical pattern, which appears when key 9 is pressed at step 1.

Referring to FIG. 9, similar to FIG. 7, FIG. 9 is a JiuGong pattern, which appears when key 9 is pressed at step 1, it includes nine radicals whose first strokes are related to the oblique shape. In this pattern, if the radical "千" is selected, then key 5 is pressed. If the radical "亻" is selected, then key 8 is pressed, and so on.

Figure 10:
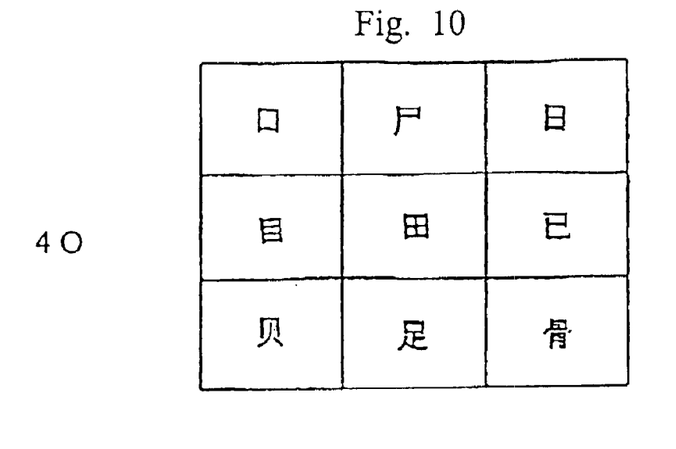
FIG. 10 is a schematic drawing of a JiuGong lattice radical pattern, which appears when key 4 is pressed at step 1.

Referring to FIG. 10, similar to FIG. 7, FIG. 10 is a JiuGong pattern, which appears when key 4 is pressed at step 1, it includes nine radicals which are related to the circle or loop shape. In this pattern, if the character or the radical "足" is selected, then key 2 is pressed; If the character or the radical "骨" is selected, then key 3 is pressed, and so on.

Figure 11:
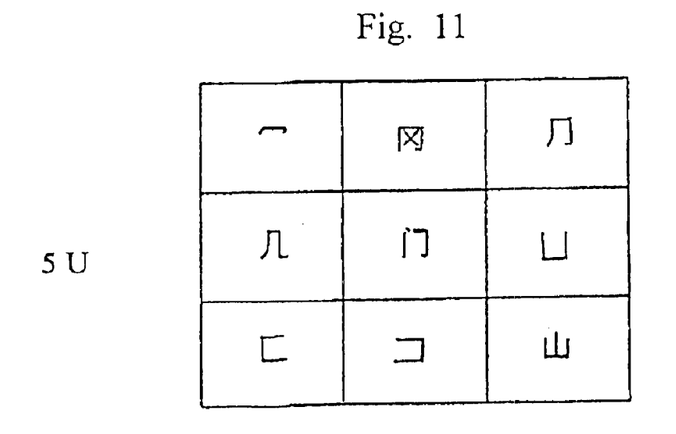
FIG. 11 is a schematic drawing of a JiuGong lattice radical pattern, which appears when key 5 is pressed at step 1.

Referring to FIG. 11, similar to FIG. 7, FIG. 11 is a JiuGong pattern, which appears when key 5 is pressed at step 1, it includes nine radicals which are related to the cave shape, and are multi-stroke radicals. In this pattern, if the radical "冖" is selected, then key 7 is pressed; If the radical "冂" is selected, then key 9 is pressed, and so on.

Figure 12:
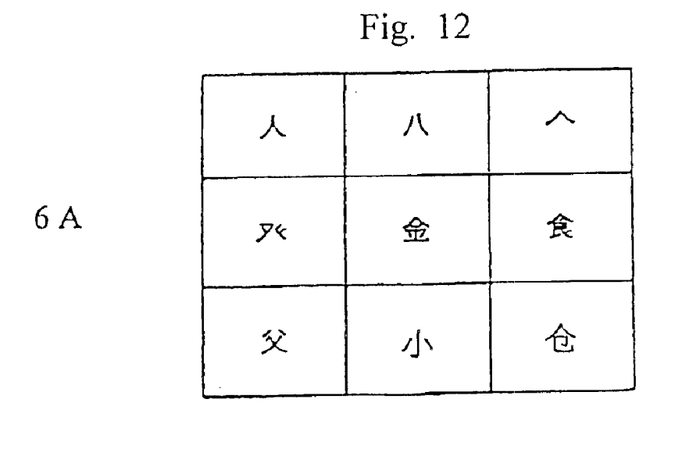
FIG. 12 is a schematic drawing of a JiuGong lattice radical pattern, which appears when key 6 is pressed at step 1.

Referring to FIG. 12, similar to FIG. 7, FIG. 12 is a JiuGong pattern, which appears when key 6 is pressed at step 1, it includes nine radicals which are related to the steeple shape. In this pattern, if the character or the radical "食" is selected, then key 6 is pressed; If the character or the radical "仓" is selected, then key 3 is pressed, and so on.

Figure 13:
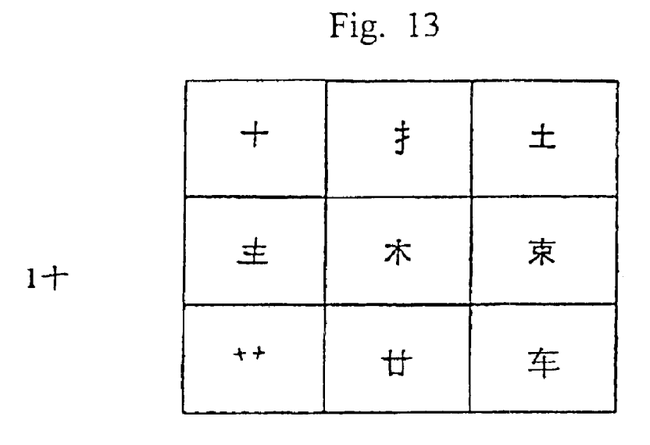
FIG. 13 is a schematic drawing of a JiuGong lattice radical pattern, which appears when key 1 is pressed at step 1.

Referring to FIG. 13, similar to FIG. 7, FIG. 13 is a JiuGong pattern, which appears when key 1 is pressed at step 1, it includes nine radicals which are related to the cross shape. In this pattern, if the radical "扌" is selected, then key 8 is pressed; If the radical "艹" is selected, then key 1 is pressed, and so on.

Figure 14:
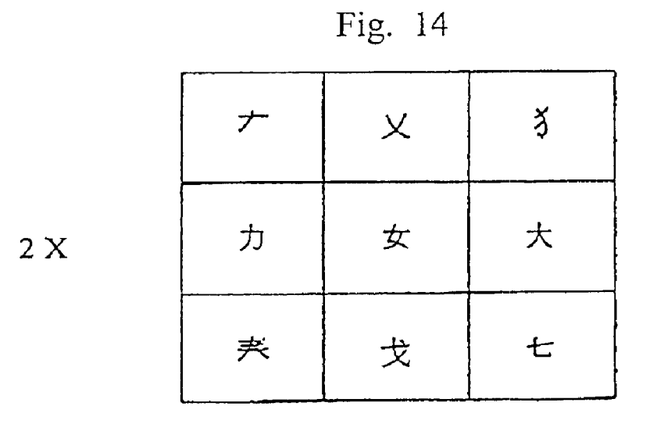
FIG. 14 is a schematic drawing of a JiuGong lattice radical pattern, which appears when key 2 is pressed at step 1.

Referring to FIG. 14, similar to FIG. 7, FIG. 14 is a JiuGong pattern, which appears when key 2 is pressed at step 1, it includes nine radicals which are related to the fork shape. In this pattern, if the radical "犭" is selected, the key 1 is pressed; If the radical "戈" is selected, then key 2 is pressed, and so on.

Figure 15:
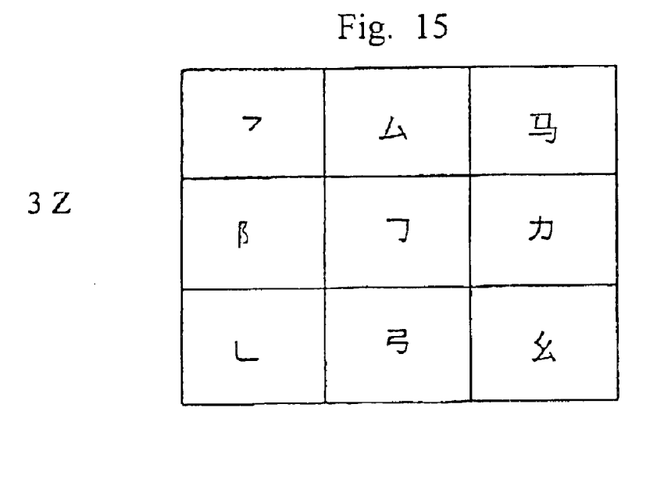
FIG. 15 is a schematic drawing of a JiuGong lattice radical pattern, which appears when key 3 is pressed at step 1.

Referring to FIG. 15, similar to FIG. 7, FIG. 15 is a JiuGong pattern, which appears when key 3 is pressed at step 1, it includes nine radicals which are related to the zigzag shape. In this pattern, if the radical "一" is selected, then key 7 is pressed; If the radical "厶" is selected, then key 8 is pressed, and so on.

FIGS. 7–15 are nine radical patterns, nine radicals each pattern, 81 radicals altogether, all Chinese characters are covered by the nine groups of radicals respectively, that is, all Chinese characters are covered by the 81 radicals. The method and effect of this coverage is also an important characteristic of the invention.

Figure 16:
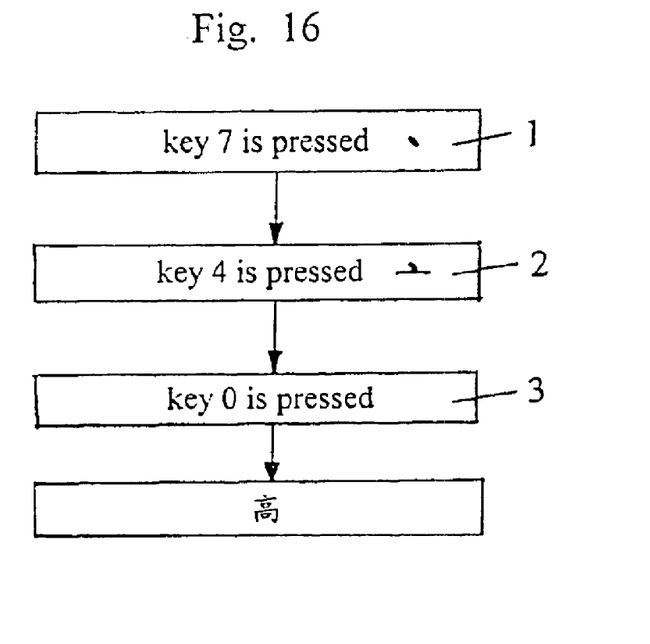
FIG. 16 is a flow chart of the example of inputting a character 高 according to the Chinese character JiuGong input method.

Referring to FIG. 16, FIG. 16 is a flow chart of a preferable embodiment in a example of inputting a character "高" according to the Chinese character JiuGong input method. As described above, the character "高" is a character which can't be split obviously into a left-half and right-half, therefore it is called a monolithic character, or a non-transverse character. Since its starting stroke is a dot shape, a number key corresponding to the dot shape is pressed at step 1. And at step 2, a number key corresponding to a radical "亠" is pressed. Now, the shape characteristics of the character "高" has been inputted, so according to the preset step rule, key 0 is pressed in case of a monolithic character at step 3, and the picture is highlighted, thus a selecting stage starts.

As seen from this, according to the Chinese character JiuGong input method, when a monolithic character is inputted, only two keys are basically needed to realize the input operation, so it is a simple input method.

Figure 17A:
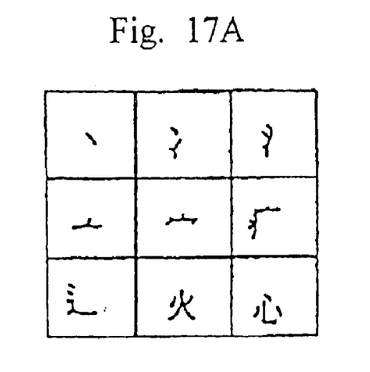
FIGS. 17A-17C are explanatory drawings of JiuGong pattern in the example of inputting a character 高 according to the Chinese character JiuGong encoding input method of the invention.
Figure 17B:
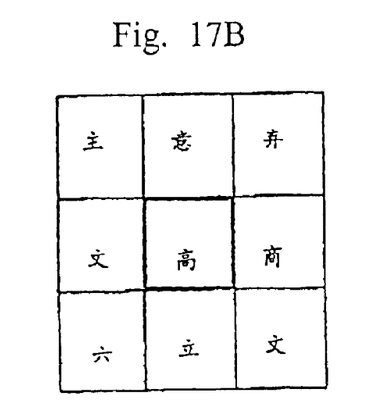
Figure 17C:
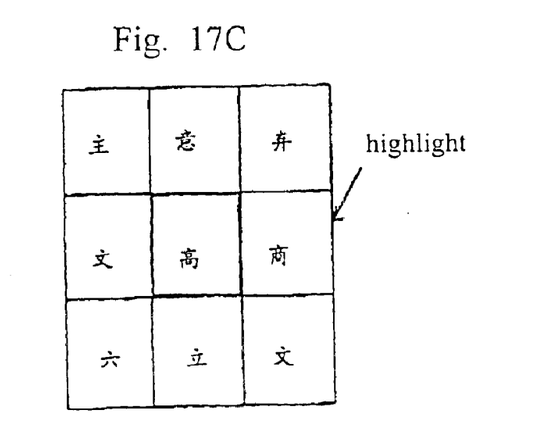

Referring to FIGS. 17A–17C, FIGS. 17A14 17C are explanatory drawings of JiuGong pattern in a example of inputting a character "高" according to the Chinese character JiuGong encoding input method of the invention. A Chinese character to be inputted here is "高", the starting stroke of which is of a dot shape, so the key 7 is pressed at step 1. After the key is pressed, a JiuGong lattice radical pattern appears on the display screen, as shown in FIG. 17A. Radical "亠" of character "高" appears in the position of the key 4 in the pattern. The key 4 is then pressed at step 2. After the key is pressed, the JiuGong pattern changes to a JiuGong lattice containing nine Chinese characters shown in FIG. 17B, in which the character "高" are included. Since the character "高" is a monolithic character, key 0 is pressed at step 3, therefore, as shown in FIG. 17C, the JiuGong lattice pattern at the lower right part is highlighted, whereby a Chinese character can be selected. As the character "高" is positioned at key 5, key 5 is pressed now, and the character "高" jumped into the position to which the cursor pointed on the display screen, so that the input operation of character "高" is completed.

Figure 18:
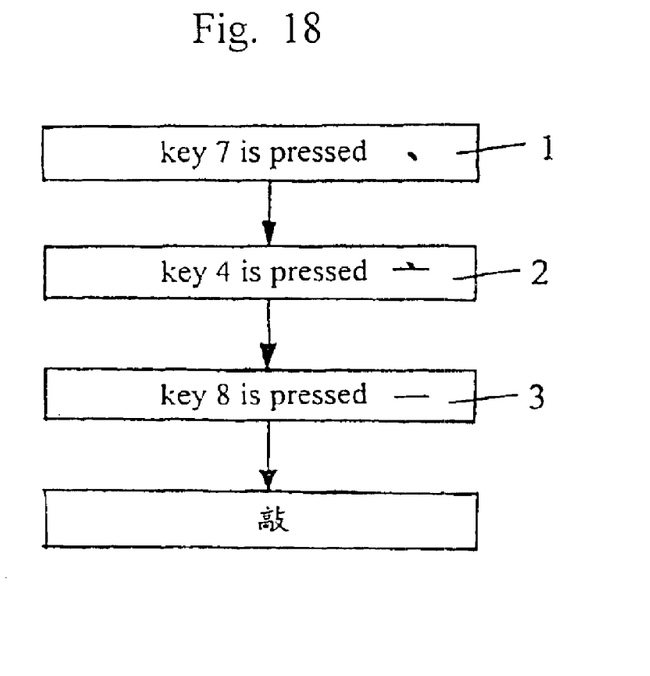
FIG. 18 is a flow chart of the example of inputting a character 高 according to the Chinese character JiuGong input method.

Referring to FIG. 18, FIG. 18 is a flow chart of the example of inputting "敲" according to the Chinese character JiuGong input method of the invention. The character "敲", different from the character "敲" which is a monolithic character, is a transverse character which can be split into a left-half and a right-half. So character "敲" is split into "高" and "攴". The steps of the Chinese character JiuGong computer input method describe above have three steps. At step 1, a number key corresponding to the dot shape of the starting stroke, i.e., key 7 is pressed. At step 2, a number key corresponding to a input radical "亠", i.e., key 4 is pressed. At step 3, a number key corresponding to a straight shape of the starting stroke of the right-half of the split Chinese character "敲", i.e., key 8 pressed. Thus the input operation of the Chinese character "敲" is completed, and a selecting stage starts.

As illustrating in the figure, the left half of the transverse character capable to be split into said two halves need not be considered at step 3, and only the starting stroke of the right half is required.

As seen from the figure, only three keys are needed to realize the input operation of a transverse character.

Figure 19A:
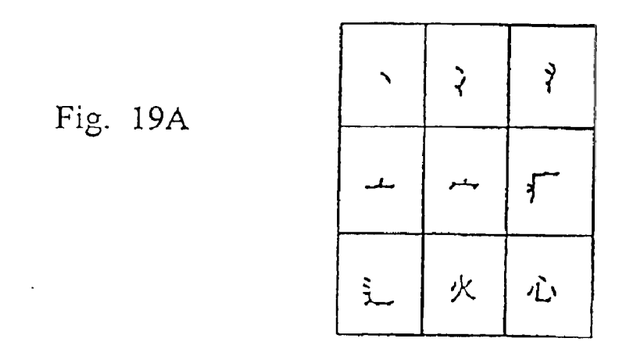
FIGS. 19A-19C are explanatory drawings of JiuGong pattern in the example of inputting a character 高 according to the Chinese character JiuGong encoding input method of the invention.
Figure 19B:
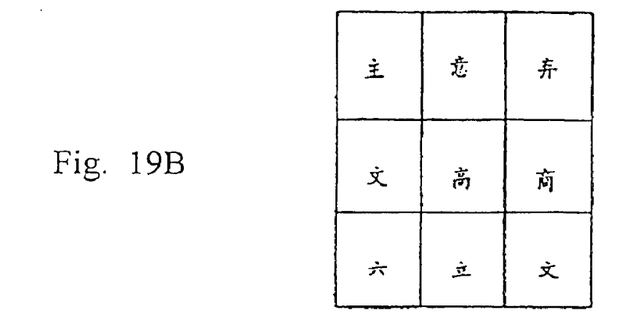
Figure 19C:
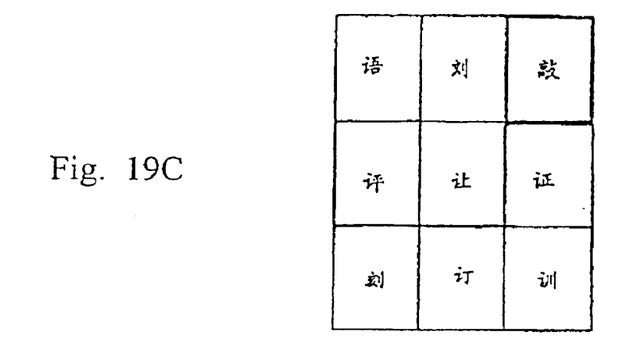

Referring to FIGS. 19A–19C, FIGS. 19A–19C are explanatory drawings of JiuGong pattern in the example of inputting a character "敲" according to the Chinese character JiuGong encoding input method of the invention. A Chinese character to be inputted here is "敲", a transverse character, and only three keys are needed to realize the input according to the fore-mentioned rule. Because its starting stroke is a dot shape, the key 7 of the keyboard, i.e. the dot shape key, is pressed at step 1. Now the JiuGong lattice on the display screen turns to be a JiuGong dot shape radical pattern, in which a radical "亠" is included at the 4$^{th}$ key's position, as shown in FIG. 19A. So the key 4 of the keyboard, i.e., the radical "亠" key is pressed at step 2. After the key is pressed, the JiuGong lattice changes to a pattern of nine Chinese characters shown in FIG. 19B. As for a transverse character, this pattern can not be used. Because the right-half of the character "敲" is a straight shape, key 8 is pressed, that is, the key 8 of the keyboard is pressed at step 3. After the key is pressed, the JiuGong lattice turns to be another JiuGong pattern of nine Chinese characters, as shown in FIG. 19C, in which the character "敲" is included. Then the character is selected, and the selected character jumps into the position to which the cursor pointed on the display screen, thereby the input operation of the character is completed.

The examples of FIG. 16 to FIG. 19C completely summarize the steps of JiuGong encoding input operation and the appearances of JiuGong lattice patterns for all Chinese characters. In the method, pattern suggestions are given. The first is a introduction pattern of FIG. 1, then radical patterns are given, so that operator need not learn by role, and with the guidance of the JiuGong pattern, it is convenient to operate.

Figure 20:
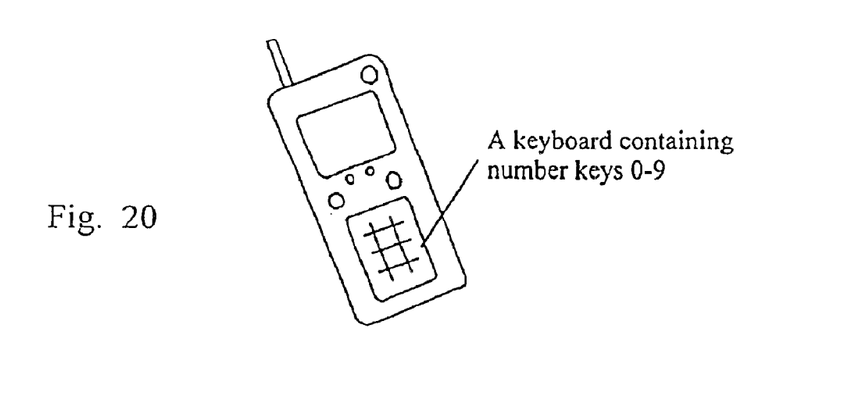
FIG. 20 is an explanatory drawing of a telephone set according to the invention.

Referring to FIG. 20, all of the methods, steps and characteristics of FIG. 1 to FIG. 19C applied to a computer, can be applied to the communication field. For example, in the mobile telephone set shown in the FIG. 20, there has been common number keyboard containing keys 0–9, thus as long as the Chinese character library, the JiuGong lattice pattern library and the exclusive control program are installed into the telephone or mobile telephone set, the Chinese character JiuGong input method of the invention can be applied to the communicative field. Since computers are widely used in the information transmission field, all the content described in FIG. 1 to FIG. 19C can be used in this field, such as wireless paging station, finance information station and the like. That is to say, the invention can be applied to the computers in the computer field, the telephone or mobile telephone set in the communication field, and a transmitting means and receiving means in the information transmission and network transmission field.

It can be concluded that, the characteristics of the Chinese character JiuGong computer encoding input method of the invention are, all of Chinese characters are classified into nine groups, i.e., dot shape, straight shape, oblique shape, circle shape, cave shape, steeple shape, cross shape, fork shape and zigzag shape. Using the shape of the character, the corresponding radical is found.

Except that only the shape of the character is needed to study, the specific steps are those of reading the graph, identifying the characters, and selecting the required character. Three minutes are enough to grasp, and its procedure is much easier than that of writing with a pen.

According to the method of the invention, more than five thousands Chinese characters, enough for normal life and even writing, can be easily inputted. The input method is not only simple, but also fast. After studying for a while, an operator can input thirty or even forty Chinese characters every minute, two times faster than with a pen.

What is claimed is:

1. A Chinese character encoding input apparatus, comprising:
   a keyboard containing at least keys numbered 1–9 and two function keys, and the keys numbered 1–9 of said keyboard correspond to nine shapes of the starting strokes of Chinese character, the nine shapes being a dot shape, a straight shape, an oblique shape, a circle shape, a cave shape, a steeple shape, a cross shape, a fork shape and a zigzag shape, and being arranged into three rows and three columns in a JiuGong lattice pattern,
   wherein, in order to input any one of the monolithic Chinese characters, only two of the keys numbered 1–9 need be pressed, and in order to input any one of the transverse Chinese characters, only three of the keys numbered 1–9 need be pressed.

2. The apparatus according to claim 1, wherein the input keyboard is a keyboard that only includes the keys numbered 1–9, a function key numbered 0, and another function key numbered 11.

3. A Chinese character encoding input method used in a computer, a telephone set, or a transmitting and receiving apparatus, the method comprising the steps of:
   providing a display capable of displaying a JiuGong lattice pattern of radicals and Chinese characters, the lattice pattern having three rows and three columns;
   providing a keyboard with keys numbered 1–9 arranged in the three rows and the three columns corresponding the lattice pattern;
   pressing one of the keys numbered 1–9 on the keypad according to one of nine different shapes of a starting stroke of the Chinese character to be inputted, whereby a JiuGong radical pattern appears;
   pressing the key corresponding to the radical in the JiuGong lattice pattern to be inputted, whereby another JiuGong lattice pattern appears containing nine other radicals; and
   if the Chinese character to be inputted is a monolithic character, pressing a key numbered 0 of the keyboard;
   if the Chinese character to be inputted is a transverse character, pressing the key numbered 1–9 corresponding to a shape of the starting stroke of a right-half of the Chinese character,
   wherein, in order to input any one of the monolithic Chinese characters, only two of the keys numbered 1–9 need be pressed, and in order to input any one of the transverse Chinese characters, only three of the keys numbered 1–9 need be pressed.

4. A computer apparatus using the method according to claim 3, comprising said keyboard, CPU, a memory, the display and a printer, wherein said apparatus also includes a Chinese character library, a JiuGong lattice pattern library and an exclusive control program, all of which are preset in the computer, or are preset in the memory of the computer, or are inputted into the computer from a medium in the form of a CD, a magnetic disk, or a storage medium.

5. The computer apparatus according to claim 4, wherein the computer apparatus can be replaced by the telephone or the mobile telephone set in the communication field.

6. The method according to claim 3, wherein the nine shapes of the starting strokes of all of the Chinese characters are a dot shape, a straight shape, an oblique shape, a circle shape, a cave shape, a steeple shape, a cross shape, a fork shape and a zigzag shape, and each of the shapes corresponds to one of the keys numbered 1–9 which are used for inputting.

7. The method according to claim 3, wherein a dot shape is denoted "*", and it covers those Chinese characters which start with a dot stroke, including 永, 实, 病, 次, 汕, 火, 心;
   a straight shape is denoted by "-", and it covers those Chinese characters which start with a horizontal or vertical stroke, including 王, 两, 面, 中, 愿, 虎;
   a oblique shape is denoted by "/", and it covers those Chinese characters which start with an oblique stroke, including 我, 毛, 香, 受, 反, 急, 年, 筹, 作;
   a circle shape is denoted by "o", and it covers those Chinese characters which include a four-sided frame, including 国, 圆, 目, 尸, 巴, 民;
   a cave shape is denoted by "U", and it covers those Chinese characters which have an incomplete frame with three sides, including 同, 山, 月, 风, 冥, 巨, 帚, 凶;
   a steeple shape is denoted by including "A", and it covers those Chinese characters which is of a steeple form, including 金, 分, 父, 谷, 小, 祭, 食;
   said cross shape is denoted by "+", and it covers those Chinese characters which include a cross form, including 直, 提, 土, 青, 木, 草, 革;
   said fork shape is denoted by "X":, and it covers those Chinese characters in which two strokes intersect to form "X", one of the two strokes is oblique including 有, 杀, 大, 春, 成, 力, 女, 也, 七; and
   said zigzag shape is denoted by "Z", and it covers those Chinese characters which have a zigzag stroke, including 了, 飞, 参, 阵, 刀, 丝, 弓, 马.

8. The method according to claim 3, wherein 81 radicals are adopted, said 81 radicals are divided into nine groups, each of the groups of nine radicals is distributed into three rows and three columns, and corresponds to number key 1–9 respectively.

9. The method according to claim 8, wherein the 81 radicals of the nine groups are determined according to radical patterns of the nine shape groups of the starting strokes of the Chinese characters, and each of the groups of radicals corresponds to one of the nine shape groups of the starting strokes of the Chinese characters.

10. The method according to claim 3, wherein the inputting steps are guided by the change of the JiuGong pattern.

* * * * *